(12) United States Patent
Kaspar

(10) Patent No.: US 6,412,962 B1
(45) Date of Patent: Jul. 2, 2002

(54) REAR VIEW MIRROR WITH PIVOTALLY MOUNTED COMPONENT MIRRORS

(75) Inventor: Rudolf Kaspar, Collenberg (DE)

(73) Assignee: Donnelly Hohe GmbH & Co. KG (DE)

( * ) Notice: Subject to any disclaimer, the term of this patent is extended or adjusted under 35 U.S.C. 154(b) by 0 days.

(21) Appl. No.: 09/621,515

(22) Filed: Jul. 21, 2000

(51) Int. Cl.[7] .......................... G02B 5/08; G02B 7/182; B60R 1/06
(52) U.S. Cl. ..................... 359/850; 359/851; 359/855; 359/865; 359/872; 359/877; 359/846
(58) Field of Search .................. 359/850, 851, 359/852, 853, 855, 865, 866, 868, 872, 877, 846

(56) References Cited

U.S. PATENT DOCUMENTS

| | | | | |
|---|---|---|---|---|
| 3,712,715 A | * | 1/1973 | Wagner | |
| 4,022,520 A | * | 5/1977 | Scifres | 359/855 |
| 4,678,294 A | * | 7/1987 | Van Nostrand | 359/865 |
| 5,052,792 A | * | 10/1991 | McDonough | 359/865 |
| 5,085,497 A | * | 2/1992 | Um et al. | |
| 5,115,352 A | * | 5/1992 | Do Espirito Santo | 359/855 |
| 5,172,262 A | * | 12/1992 | Hornbeck | 359/855 |
| 5,295,021 A | * | 3/1994 | Swanson | 359/850 |
| 5,500,766 A | * | 3/1996 | Stonecypher | 359/855 |
| 5,627,688 A | * | 5/1997 | Valentino | 359/843 |
| 5,687,035 A | * | 11/1997 | Lang | 359/865 |
| 5,760,978 A | * | 6/1998 | Smith | 359/855 |

FOREIGN PATENT DOCUMENTS

| | | |
|---|---|---|
| DE | 298 20 253 U1 | 8/1999 |
| EP | 0 895 098 A1 | 2/1999 |

* cited by examiner

Primary Examiner—Ricky D. Shafer
(74) Attorney, Agent, or Firm—McGlew and Tuttle, P.C.

(57) ABSTRACT

A rear view mirror (1) for a motor vehicle is disclosed having a mirror element, in the mirror surface of which the driver may observe the traffic behind the driver. In order variably to be able to vary the reflection detail shown in the rear view mirror (1), the mirror element (2) is composed of a plurality of component mirrors (3). These component mirrors (3) are arranged so as to be pivotally mounted on a base plate (5) and the angle of reflection of each component mirror (3) may be adjusted through control of at least one associated drive unit (6).

7 Claims, 2 Drawing Sheets

REAR VIEW MIRROR WITH PIVOTALLY MOUNTED COMPONENT MIRRORS

FIELD OF THE INVENTION

The invention relates to a rear view mirror for a motor vehicle having a mirror element, in the mirror surface of which the driver may observe the traffic behind him. The invention further relates to various methods of controlling a rear view mirror according to the invention.

BACKGROUND OF THE INVENTION

Rear view mirrors of the type described are used in vehicles of all kinds, such as e.g. passenger cars, trucks and motorcycles, to enable the driver to observe the traffic behind him. Here, there is fundamentally a distinction between inside rear view mirrors, which are disposed in the interior of a vehicle, and outside rear view mirrors which are disposed outside of the vehicle. As the mirror element of the known rear view mirrors, glass mirror elements are mainly used.

The drawback of the known mirror glasses is that the available reflective surface is permanently defined by the style of construction and cannot be varied. Thus, mirror glasses both with a flat and with a convex reflective surface are known. A switchover between a flat and convex reflective surface is however not possible with the conventional mirror glasses so that, for example, the enlargement ratio of an imaged reflection detail is defined invariably by the curvature of the mirror glass. Nor is it possible to present different reflection details which are adjustable by the driver.

SUMMARY AND OBJECTS OF THE INVENTION

The object of the present invention is to provide a rear view mirror, the reflective surface of which may be variably adjusted to the needs of the driver.

The invention is based on the fundamental idea that the reflective surface of the rear view mirror is not formed by one mirror element but is composed of a plurality of, but at least two, component mirrors. These component mirrors are pivotally mounted on a base plate and each component mirror may be displaced relative to the base plate by activating a drive unit associated with the respective component mirror. Independent adjustment of the angle of reflection of each individual component mirror is therefore possible. By virtue of the coordinated adjustment of the various angles of reflection of the component mirrors, reflective surfaces of differing characteristics may be achieved. By virtue of the arrangement of a plurality of component mirrors in the reflective surface, the surface as a whole appears homogeneously reflective. When only a few component mirrors are used, each component mirror may be directed independently of one another towards a different reflection detail. Depending on the actual driving situation, e.g. driving on a freeway or maneuvring into a parking space, the reflective surface may be varied and adapted in each case by altering the setting of the component mirrors. A rear view mirror according to the invention may be used both as an outside and as an inside rear view mirror.

It is particularly advantageous when the component mirrors are adjustable in a coordinated manner by means of a central control unit. The control unit in said case translates the control commands of the driver, e.g. the adjustment of a reflective surface with convex mirror characteristics, into corresponding control commands for adjustment of the various component mirrors.

The component mirrors may in principle be mounted in any desired manner on the base plate. It is particularly advantageous when the component mirrors are connected by a resilient connecting element to the base plate. The resilient connecting element by means of its load-free basic alignment defines the normal position of each component mirror. Thus, for example, a flat reflective surface may be formed when all of the component mirrors are in the normal position. By virtue of the resilient properties of the connecting element, each component mirror after deflection by the associated drive unit is restored resiliently into the normal position so that, e.g. in the event of failure of one or more drive devices, a basic function of the rear view mirror is maintained.

The component mirrors may in principle be of any desired design. Particularly easy manufacture is achieved when the component mirrors are manufactured using thin-film technology. Corresponding components are already known from prior art for use in optoelectronics and are usually known as digital micromirror devices (DMDs). Such DMD chips are available from, for example, Texas Instruments, which use over 500000 microscopic mirrors on a chip to reflect images on a screen. Such DMD chips comprise a plurality of miniaturized component mirrors, which may be displaced by means of drive units integrated on the chip. Such DMD chips may, in order to realize a rear view mirror according to the invention, be integrated in the mirror surface of the rear view mirror. In such case, according to the invention it is immaterial whether the entire mirror surface or only a part of it is formed by DMD chips. Depending on the size of the available DMD chips, a plurality of DMD chips may also be arranged adjacent to one another to realize the mirror surface.

In order to adapt the mirror element 2 composed of component mirrors 3 to a specific mirror surface contour, the component mirrors disposed in the region of the edge of the mirror element may be partially and/or completely covered by another component, e.g. the edge of the mirror housing.

Through use of the component mirrors according to the invention it is conceivable that mirror-adjusting mechanisms suitable for adjusting the rear view mirror to adapt it to the needs of the driver and known from prior art will no longer be required because the adjustment is effected by means of the adjustment according to the invention of the component mirrors. And as a result of the use of DMD chips a substantial amount of weight and space is saved.

A further advantage arises when the component mirrors may be displaced at high frequency between a reflector position and an anti-dazzle position, such as is possible for example with DMD chips. In the reflector position a specific reflection detail is imaged in the mirror surface of the component mirror, whereas in the anti-dazzle position there is no visible imaging. By switching back and forth between the two positions at a suitably high frequency an anti-dazzle effect may be achieved so that, for example, the light of the headlamps of vehicles following behind is imaged only with a diminished light intensity. Other anti-dazzle devices, such as are occasionally used with conventional mirrors, are therefore no longer required. The anti-dazzle factor may be adjusted by varying the switching rate.

For control of the component mirrors according to the invention, it is further advantageous when at least some of the component mirrors are adjustable to a separate field of vision. Thus, for example, when driving on a freeway the blind angle at the driver's side may be included in the field of vision. It is also conceivable, when reversing, for the component mirrors at the front passenger side to be adjusted in the manner of a parking aid so that the curbstone at the front passenger side comes into the field of vision.

As each individual component mirror may be controlled individually, it is also possible for the component mirrors in dependence upon their position on the base plate to be adjusted at different angles such that the mirror surface as a whole acts like a Fresnel lens. The component mirrors in said case form, for example, concentric circles or segments of a circle and the component mirrors of one circle or segment of a circle have the same setting angle and the setting angle of the various circles or segments of a circle varies in dependence upon the distance from the center of the circle. By controlling the component mirrors in such a way as to act like a Fresnel lens, enlargements or reductions of a reflection detail may be presented with an appropriate enlargement ratio in the reflective surface.

Control of the component mirrors is preferably effected by means of suitably programmable control software.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
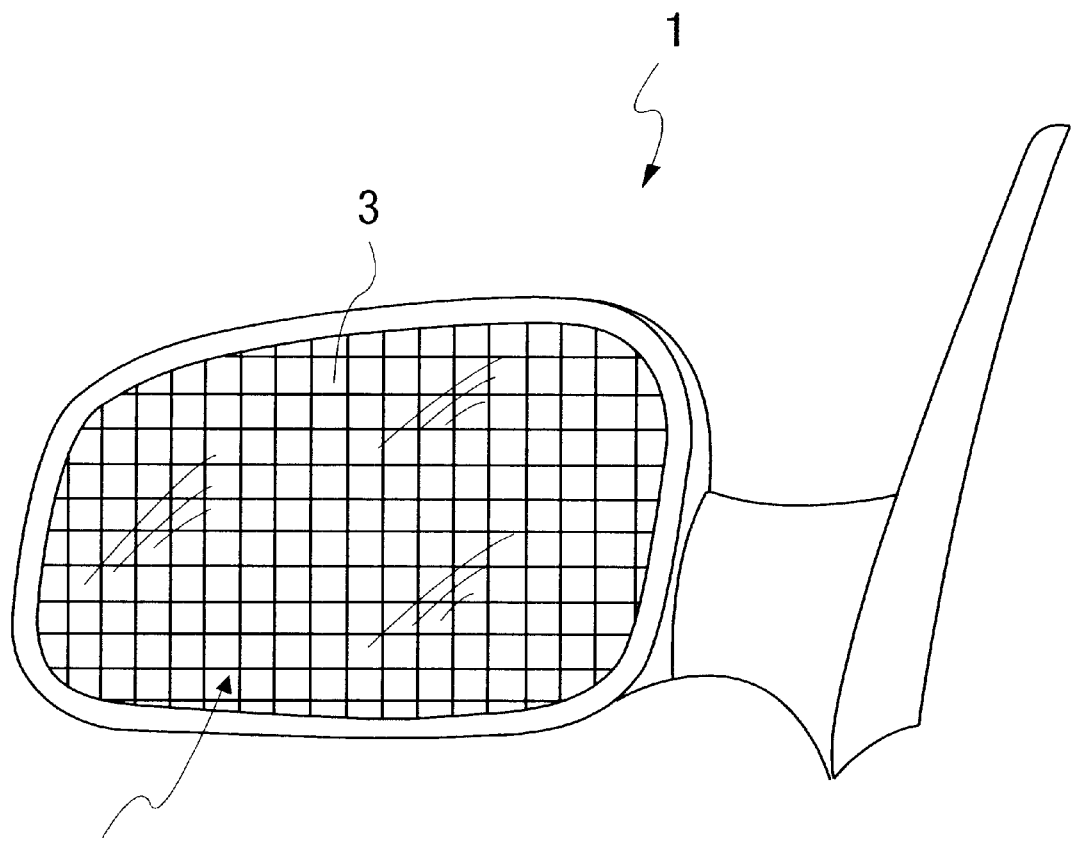
FIG. 1 is a view of an outside rear view mirror viewed from the rear.

Referring to the drawings in particular, FIG. 1 shows an outside rear view mirror 1, the mirror element or mirror structure generally designated 2 of which is composed of a plurality of component mirrors 3 arranged in a grid-like manner. The size of the component mirrors shown in FIG. 1 is merely shown by way of example and may be reduced or increased in dependence upon the desired function. It is in such case conceivable for a mirror element to comprise several thousand, ten thousand or even more component mirrors, especially when DMD chips are used. For another application, the restriction to merely two component mirrors is also conceivable.

Figure 2:
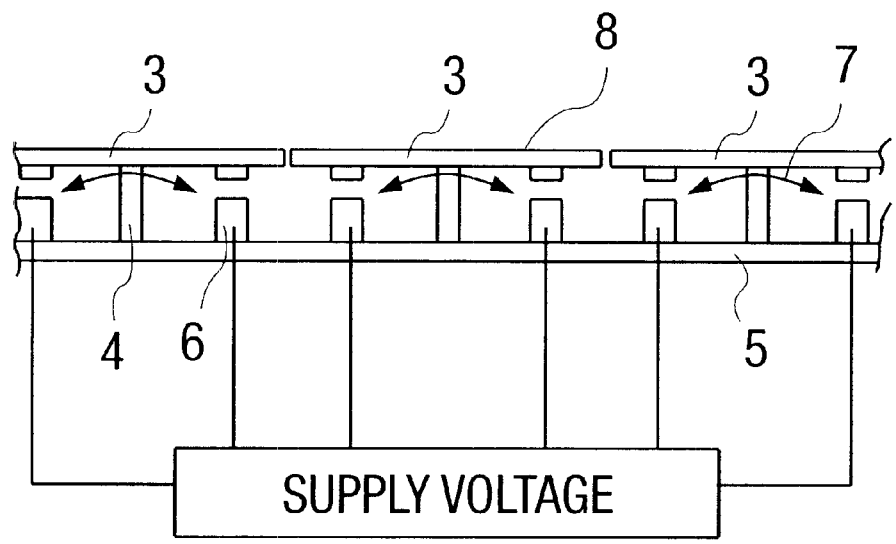
FIG. 2 is a cross sectional view of the mirror element of the outside rear view mirror according to FIG. 1.

FIG. 2 shows a detail from the mirror element 2 in cross section. Three component mirrors 3 may be seen, which are each connected by a resilient connecting element 4 to a base plate 5. The reflective surfaces 8 of the component mirrors 3 are directed upwards in the view of FIG. 2. Disposed below each of the component mirrors 3 are four electrodes 6, only two of which are shown in FIG. 2. Through control of the electrodes 6 the component mirrors 3 may be swivelled in accordance with the direction arrows 7 so that the angle of reflection varies. The adjusted angle of reflection may in this case be varied by the supply voltage applied to the electrodes 6. As soon as the supply voltage of all of the electrodes is set to zero, the connecting elements 4 relax and the component mirrors 3 are automatically restored into the normal position, in which together they produce a flat reflective surface.

Figure 3:
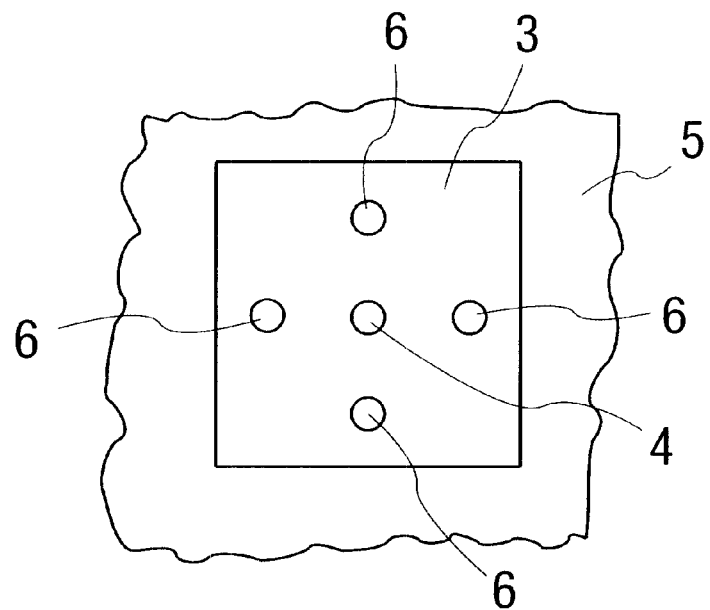
FIG. 3 is a plan view of a component mirror for use in an outside rear view mirror according to FIG. 1.

FIG. 3 shows a component mirror 3 in a plan view, in which for the sake of greater clarity the component mirrors surrounding the illustrated component mirror 3 have been omitted from the base plate 5. It is possible to see in FIG. 3 the merely indicated connecting element 4, which is disposed between the component mirror 3 and the base plate 5, and four likewise indicated electrodes 6 associated with the component mirror 3. Through coordinated control of the four electrodes 6 the component mirror 3 may be tilted through any angle about its fastening point. Naturally, other drive principles and drive kinematics are also conceivable.

While specific embodiments of the invention have been shown and described in detail to illustrate the application of the principles of the invention, it will be understood that the invention may be embodied otherwise without departing from such principles.

What is claimed is:

1. A rear view mirror for a motor vehicle, the rear view mirror comprising:

a mirror structure having a mirror surface of which a driver of the motor vehicle may observe the traffic behind him, wherein the mirror structure comprises a base plate and a plurality of component mirrors, said component mirrors being arranged so as to be pivotally mounted on said base plate and at least one associated drive unit, an angle of reflection of each component mirror being adjustable through control of said at least one associated drive unit, wherein at least one of said component mirrors comprises a digital micromirror device (DMD) chip.

2. A rear view mirror as claimed in claim 1, further comprising a central control unit, wherein said component mirrors are adjustable in a coordinated manner by said central control unit.

3. A rear view mirror as claimed in claim 2, further comprising a resilient connecting element, wherein said component mirrors are connected by said resilient connecting element to said base plate.

4. A rear view mirror as claimed in claim 1, further comprising a resilient connecting element, wherein said component mirrors are connected by said resilient connecting element to said base plate.

5. A rear view mirror as claimed in claim 1, wherein at least some of said component mirrors, which component mirrors are disposed in the region of the edge of the mirror structure are partially completely covered by another component.

6. A rear view mirror for a motor vehicle, the rear view mirror comprising:

a mirror structure having a mirror surface of which a driver of the motor vehicle may observe the traffic behind him, wherein the mirror structure comprises a base plate and a plurality of component mirrors, said component mirrors being arranged so as to be pivotally mounted on said base plate and at least one associated drive unit, an angle of reflection of each component mirror being adjustable through control of said at least one associated drive unit;

a central control unit, wherein said component mirrors are adjustable in a coordinated manner by said central control unit;

a resilient connecting element, wherein said component mirrors are connected by said resilient connecting element to said base plate;

wherein at least one of said component mirrors comprises a digital micromirror device (DMD) chip.

7. A rear view mirror as claimed in claim 6, wherein at least some of said component mirrors, which component mirrors are disposed in the region of the edge of the mirror structure are partially or completely covered by another component.

* * * * *